United States Patent [19]

Sinfelt et al.

[11] B 3,925,196

[45] Dec. 9, 1975

[54] REFORMING PROCESS

[75] Inventors: John H. Sinfelt, Berkeley Heights; James L. Carter, Chatham, both of N.J.

[73] Assignee: Exxon Research & Engineering Co., Linden, N.J.

[22] Filed: Oct. 31, 1973

[21] Appl. No.: 411,483

[44] Published under the Trial Voluntary Protest Program on January 28, 1975 as document no. B 411,483.

Related U.S. Application Data

[63] Continuation-in-part of Ser. No. 111,695, Feb. 1, 1971, Pat. No. 3,789,020.

[52] U.S. Cl.................................. 208/139; 252/441
[51] Int. Cl.².......................................... C10G 35/06
[58] Field of Search....... 208/139; 252/442, 466 PT, 252/477 R, 477 Q

[56] References Cited
UNITED STATES PATENTS

| | | | |
|---|---|---|---|
| 2,384,501 | 9/1945 | Streicher | 252/477 Q |
| 2,423,835 | 7/1947 | Houdry | 260/680 R |
| 2,802,794 | 8/1957 | Sprauer | 252/466 PT |
| 2,854,404 | 9/1958 | Prater et al. | 208/139 |
| 2,890,178 | 6/1959 | Thorn et al. | 252/466 PT |
| 2,897,137 | 7/1959 | Schwarzenbek | 252/466 PT |
| 3,415,737 | 12/1968 | Kluksdahl | 208/138 |

Primary Examiner—Delbert E. Gantz
Assistant Examiner—S. Berger

[57] ABSTRACT

Naphtha reforming processes are promoted with a catalyst comprising two or more metals in low concentration and one or more nonmetallic refractory materials in high concentration. The catalyst is prepared by supporting the metals on a minor fraction of the total nonmetallic refractory material, of the catalyst, and mixing said fraction with the remaining nonmetallic refractory material, of the catalyst, whereby the overall catalyst, at reaction conditions, consists of a physical mixture of the supported metallic component and the remaining nonmetallic refractory material. In a preferred embodiment, the supported metallic component of the catalyst comprises two metals, one from Group VIII and one from Group IB, or both from Group VIII.

15 Claims, No Drawings

REFORMING PROCESS

CROSS-REFERENCE TO RELATED APPLICATION

This application is a continuation-in-part of Ser. No. 111,695, filed Feb. 1, 1971, now U.S. Pat. 3,789,020.

BACKGROUND OF THE INVENTION

1. Field of the Invention

Naphtha reforming processes are promoted with a catalyst comprising two or more metals in low concentration and one or more nonmetallic refractory materials in high concentration. The catalyst is prepared by depositing the metals on a fraction of the nonmetallic refractory material, and mixing the resulting material with the remaining nonmetallic refractory material, whereby the overall catalyst, at reaction conditions, consists of a physical mixture of the supported metallic component and the remaining nonmetallic refractory material. In a preferred embodiment, the supported metallic component of the catalyst comprises two metals, one from Group VIII and one from Group IB (copper, silver and gold), or both from Group VIII.

2. Description of the Prior Art

Supported, multimetallic catalyst for reforming, isomerization, and related processes are known in the art, and have been reported to possess certain advantages when the metals are present as an alloy. In U.S. Pat. No. 3,415,737, for example, a platinum-rhenium on alumina system is described. It is also known in the art that in a bifunctional catalyst, wherein a nonmetallic refractory material provides acidic sites which in conjunction with a metal component catalyze isomerization and hydrocracking reactions, the physical separation of the metal from most of the acidic sites, whereby the metal is supported on a small fraction of the total nonmetallic refractory material, minimizes harmful interaction between the two types of sites and can lead to much improved catalytic activity. This procedure is described in U.S. Pat. No. 3,346,510 relating primarily to systems comprising platinum and nonmetallic refractory materials such as alumina, silica, and aluminosilicates. U.S. Pat. Nos. 2,897,137 and 2,890,178 are concerned with procedures for preparing catalysts by concentrating the catalyst metals on a portion of the catalyst support.

SUMMARY OF THE INVENTION

It has now been discovered unexpectedly that naphtha reforming operations can be promoted efficiently utilizing catalysts comprising two or more metals in low concentration and one or more nonmetallic refractory materials, wherein the catalyst metals are supported on a fraction of the nonmetallic refractory material in the catalyst, such that the overall catalyst, at reaction conditions, consists of a physical mixture of the supported metallic component and the remaining nonmetallic refractory material.

The nonmetallic refractory material of the instant reforming catalyst is preferably a porous, adsorptive material having a surface area, as determined by the Brunauer-Emmett-Teller method (BET), of from about 20 to 800, preferably 100 to 300, square meters per gram. The material should be substantially refractory at the temperature conditions utilized in the naphtha reforming process. Preferred materials include: (a) refractory inorganic oxides such as alumina, titania, zirconia, magnesia, silica, chromia, silica alumina, crystalline aluminosilicates, alumina-titania, silica-zirconia, alumina-chromia, etc., and (b) mixtures of one or more of these materials.

In general, excellent process results are observed when the nonmetallic refractory material is an alumina-containing composition, in particular, gamma-alumina or eta-alumina. Alumina is the preferred material. The above-described materials are known articles of commerce and can be prepared for use as catalyst constituents using various techniques.

Typically, the catalysts of this invention are used in the form of spheres, granules, powders, extrudates, pellets, etc. The precise size or form of the final catalyst is dependent upon many engineering factors not within the purview of the instant invention.

In the present invention, all of the catalyst metal components are preferably supported on less than about one-fourth of the total nonmetallic refractory material via impregnation, and mixed with the remaining nonmetallic refractory material that is substantially or completely free of Group IB, VIIB and/or VIII metal, the final catalyst consisting of a physical mixture of the supported metallic component with the remaining nonmetallic refractory material. More preferably, all of the metal components are concentrated on about one-tenth or less of the total nonmetallic refractory material.

The supported metallic component may be prepared by a variety of methods. A nonmetallic refractory material may be coimpregnated with a solution of precursors of the desired metals, such as a solution of salts of both metal components. Although the metal salts can be impregnated serially or simultaneously, the latter is preferred for the formation of polymetallic cluster structures on subsequent reduction. The reduction may be accomplished readily at temperatures of 500° to 1100°F and pressures of 1 to 50 atm.

Thus, salts chosen for preparing the catalyst are those which can be reduced readily to the corresponding metals, e.g., the halides or acid halides, nitrates, etc. Salts and acids which contain the metallic component in the anion may also be used, e.g., chloroplatinic acid and chloroiridic acid. In the final catalyst mixture, it is not necessary that the refractory material used as a support for the metals be the same refractory material used as a separate component of the mixture. For example, the metals may be supported on silica and then mixed with alumina. Typically, the resulting mixture would then be formed into pellets or extrudates.

The catalysts prepared by the method of the instant invention generally contain less than 10% by weight metal and the remainder nonmetallic refractory material. Preferably the metals comprise less than 5% by weight of the nonmetallic refractory material, and most preferably comprise less than about 1%. Preferably the final catalyst also contains from 0.1% to about 3.0% by weight of halogen, most preferably from about 0.1 to 2.0 wt %, especially chlorine and/or fluorine, based on the nonmetallic refractory material. Halogen may be incorporated into the catalyst at any suitable stage in the catalyst manufacture. Halogen is often introduced into the catalyst with halogen-bearing metal catalyst components, such as chloroplatinic acid. Additional amounts of halogen may be incorporated in the catalyst by contacting it or a portion thereof with hydrogen fluoride, ammonium flouride, hydrogen chloride, ammonium chloride and the like either prior to or subsequent to the metal impregnation step, or after the supported metal component is mixed with the remaining nonmetallic refractory material. Halogen may also be incorporated by contacting the catalyst or a portion thereof with a gaseous stream containing the halogen, generally chlorine.

The catalysts prepared by the method of the instant invention comprise two or more metals. Preferably the catalyst is bimetallic or trimetallic. The metals useful within the scope of the instant invention are generally selected from Groups VIII, VIIB (rhenium) and IB of the Periodic Table of the Elements. Preferably at least one metal is selected from Group VIII of the Periodic Table of the Elements, and more preferably at least one metal is selected from the group consisting of Pt, Ir, Rh, Ru, Pd and Os. Most preferably one of the metals is Pt or Ir. The remaining metal or metals are preferably selected from Groups VIII, VIIB, or IB of the Periodic Table of the Elements, and most preferably from the group consisting of Pt, Pd, Ir, Rh, Ru, Os, Au, Cu, Ag and Re. Specific nonlimiting examples of catalysts prepared by the method of the instant invention are Pt-Re-alumina, Pt-Ir-alumina, Pt-Pr-Rh-alumina, Pt-Rh-alumina, Ir-Au-alumina, Ir-Cu-alumina, Pt-Pr-Ru-alumina, Pt-Cu-alumina, Pt-Au-alumina, Pt-Ir-Au-alumina, and Pt-Ir-Cu-alumina.

The metals can be present in the catalyst in any ratio to each other, depending on the requirements of the reaction process which utilizes the catalyst. Specifically, in a reforming process the catalyst will comprise from about 0.1 to about 2.0 weight % total metal based on total alumina, and the remainder alumina plus halogen.

In the naphtha reforming (hydroforming) process of the present invention, a catalyst comprising a mixture of 75 to 90 parts by weight of alumina and 10 to 25 parts by weight of an alumina-supported multimetallic component comprising one or more Group VIII metals alone or in combination with Group VIIB and/or IB metals is contacted with naphtha feed stock, preferably a substantially sulfur-free naphtha feed stock, containing from about 15 to 75 volume percent paraffins, 15 to 75 volume percent naphthenes and about 2 to 25 volume percent aromatics and boiling at atmospheric pressure in the range of from about 120° to 400°F, preerably from about 150° to 375°F, in the presence of hydrogen. The contacting is carried out typically in the vapor phase at temperatures varying from about 750° to 975°F. Reaction zone pressure may vary from about 1 to 50 atmospheres, preferably from about 5 to 30 atmospheres.

The naphtha feed stream is generally passed over the catalyst at space velocities varying from about 0.5 to 20, preferably from about 1 to 10, and most preferably from about 1 to 5 parts by weight of naphtha per hour per part by weight of catalyst (w/hr/w). The hydrogen to hydrocarbon mole ratio within the reaction zone is maintained between about 0.5 and 20, preferably between about 1 and 10. During the reforming process the hydrogen employed can be admixed with light gaseous hydrocarbons. Since the reforming process produces large quantities of hydrogen, a recycle stream is employed normally as a hydrogen source. Typically, the reforming operation is conducted in the presence of from 2,000 to 6,000 standard cubic feet of hydrogen rich recycle gas per barrel of naphtha feed stock.

In a typical naphtha reforming process, the catalyst is maintained as a fixed bed within the series of adiabatically operated reactors. The product stream from each reactor (except from the last reactor) in the reactor train is reheated prior to introduction into the following reactor. If desired, the catalyst may be employed in a moving bed operation in which the naphtha feed stock, hydrogen and catalyst are passed through the reactor or in a fluidized system wherein the naphtha feed stock is passed upwardly through a turbulent bed of finely-divided catalyst.

DESCRIPTION OF THE PREFERRED EMBODIMENTS

Following are a number of specific examples illustrating the teachings of the instant invention.

EXAMPLE 1 — Preparation of Pt-Cu-Alumina Catalysts

In this example two catalysts were prepared with the overall composition of 0.3 wt. % Pt and 0.3 wt. % Cu with the balance being alumina plus halogen. Catalyst A was prepared by the method of the instant invention and Catalyst B was prepared by a conventional impregnation technique.

Catalyst A was prepared by impregnating 5 grams of eta alumina with an aqueous solution containing chloroplatinic acid and copper nitrate in amounts calculated to give 0.15 gram of Pt and 0.15 gram of Cu. The resulting material was dried at 220°F for 16 hours and then mixed intimately with 45 grams of eta alumina in a ball mill.

Catalyst B was prepared by impregnating 50 grams of eta alumina with 30 ml of an aqueous solution containing sufficient chloroplatinic acid and copper nitrate to give 0.15 gram of Pt and 0.15 gram of Cu. The material was then dried at 220°F for 16 hours. These catalysts were activated by reduction in hydrogen at the run conditions shown in Examples 2 and 3 prior to testing.

EXAMPLE 2

The catalysts prepared in Example 1 were tested for the conversion of methylcyclopentane. It can be seen from Table I that Catalyst A, prepared by the method of the instant invention, has a higher activity for the conversion of methylcyclopentane than does Catalyst B.

TABLE I

|  | Catalyst A | Catalyst B |
|---|---|---|
| % Conversion of methylcyclopentane | 19.3 | 9.9 |
| Temperature 850°F, Pressure 200 PSIG | | |
| Hydrogen to Hydrocarbon Mole Ratio = 5/1 | | |
| Space Velocity = 30 w./hr/w. | | |

EXAMPLE 3

The catalysts prepared in Example 1 were tested for the reforming of a naphtha stream. Table II shows that Catalyst A, prepared by the method of the instant invention, produces a product with a much higher Research Octane number than the catalyst prepared by the conventional method. The feed was a Louisiana naphtha with an approximate boiling range of 200°–325°F, and contained 40–45% naphthenes, 40–45% paraffins, and the remainder aromatics.

TABLE II

|  | Catalyst A | Catalyst B |
|---|---|---|
| Research Octane Number | 99 | 84 |
| Temperature 940°F, Pressure 200 PSIG |  |  |
| Hydrogen to Hydrocarbon Mole Ratio = 5/1 |  |  |
| Space Velocity - 1.5 w./hr./w. |  |  |

EXAMPLE 4 — Preparation of a Pt-Re-Alumina Catalyst

In this example, two catalysts with the overall composition of 0.3 wt. % Pt and 0.3 wt. % Re, with the balance being alumina plus halogen, were prepared. Catalyst C was prepared by the method of the instant invention and Catalyst D was prepared by a conventional impregnation technique.

Catalyst C was prepared by impregnating 5 grams of eta alumina with an aqueous solution containing chloroplatinic and perrhenic acids in amounts required to give 0.15 gram of Pt and 0.15 gram of Re. This material was then dried at 220°F for 16 hours and mixed intimately with 45 grams of eta alumina in a ball mill.

Catalyst D was prepared by impregnating 50 grams of eta alumina with 30 ml of an aqueous solution of chloroplatinic and perrhenic acids using concentrations selected to give 0.15 gram of Pt and 0.15 gram of Re, and then drying at 220°F for 16 hours.

These catalysts were activated by reduction in hydrogen at the run conditions shown in Example 5 prior to testing.

EXAMPLE 5

The catalysts prepared in Example 4 were tested in a process for reforming n-heptane. The catalyst prepared by the method of the instant invention decreased conversion to the undesirable $C_1$ to $C_4$ products.

TABLE III

COMPARISON OF PREPARATION PROCEDURES
FOR PLATINUM-RHENIUM CATALYSTS
FOR NORMAL HEPTANE REFORMING*

| Selectivity Weight % | Catalyst C | Catalyst D |
|---|---|---|
| $C_1$-$C_4$ | 27.2 | 31.9 |
| $C_5$-$C_6$ | 13.4 | 15.6 |
| Iso $C_7$ | 39.2 | 33.0 |
| Benzene + Toluene | 20.2 | 19.5 |
| % Conversion | 79.2 | 87.3 |
| Run Conditions |  |  |

Temperature = 925°F, Space Velocity = 20 w./hr./w,
Pressure = 200 PSIG, 5/1 Mole Ratio of $H_2$/n-heptane

*Overall Catalyst Composition for All Catalysts: 0.3% Pt, 0.3% Re, 99.4% $Al_2O_3$ + Halogen

EXAMPLE 6

Three naphtha reforming catalysts were prepared following the procedure of the instant invention and subsequently tested to determine the ability of each catalyst to promote the conversion of methylcyclopentane to benzene. The conversion of naphthenic compounds to aromatic materials is one of the principal reactions occurring during the course of a naphtha reforming process.

The first catalyst consisted of 0.3 wt. % platinum and 0.3 wt. % chlorine contained on eta alumina. The catalyst was prepared by impregnating 10% of the alumina employed in the catalyst with chloroplatinic acid. The resulting impregnate was dried at 120°C. and ball milled with the remaining 90% of the eta alumina to secure the finished catalyst. The second catalyst consisted of 0.4 wt. % platinum and 0.3 wt. % chlorine on eta alumina and was prepared in the same manner as the first catalyst except that 75% of the platinum was derived from chloroplatinic acid and the balance derived from $Pt(NH_3)_2(NO_2)_2$. The third catalyst consisted of 0.3 wt. % platinum, 0.1 wt. % copper and 0.3 wt. % chlorine on eta alumina. This catalyst was prepared in the same manner as the first catalyst except that the 10% portion of the eta alumina was coimpregnated with an aqueous solution of chloroplatinic acid and copper nitrate to give the required metals concentration.

The catalysts were subsequently tested at 850°F and 200 psig pressure to determine the ability of each of the catalysts to promote the conversion of methylcyclopentane in the presence of hydrogen* to benzene. The reaction zone space velocity in each of the tests was set to secure a 30% conversion of the methylcyclopentane. The test results indicated that the first and second catalysts, which were prepared following the general procedures of U.S. Pat. Nos. 2,890,178 and 2,897,137, converted only from 13 to 26% of the reacted methylcyclopentane to benzene. In contrast, the third catalyst converted 55% of the methylcyclopentane reacted to the desired benzene product.

*(hydrogen to methylcyclopentane molar ratio maintained at 5:1)

What is claimed is:

1. A process for the reforming of naphtha feed stocks which comprises contacting a naphtha feed stock and hydrogen at reforming conditions with a catalyst composition comprising a physical mixture of a metal component supported on a nonmetallic refractory material and additional nonmetallic refractory material, said supported metal component comprising a combination of Group VIII metals or a combination including at least one Group VIII metal and at least one metal selected from Group IB or VIIB metals contained on a nonmetallic refractory material, the nonmetallic refractory material of said supported component comprising less than about one-fourth of the total nonmetallic refractory material of said catalyst, said catalyst additionally containing a halogen constituent.

2. The process of claim 1 wherein said nonmetallic refractory material is alumina.

3. The process of claim 1 wherein said metals are supported on less than about one-tenth of the total nonmetallic refractory material of said catalyst.

4. The process of claim 1 wherein one of said catalyst metals is platinum.

5. The process of claim 1 wherein said catalyst metals are present in said catalyst in amounts less than about 1.0 wt. % based on total nonmetallic refractory material.

6. The process of claim 1 wherein said catalyst contains from 0.1 to about 3.0 wt. % halogen, based on nonmetallic refractory material.

7. The process of claim 6 wherein said halogen is chlorine.

8. The process of claim 2 wherein said catalyst metals are present in amounts less than about 1.0 wt. % based on total nonmetallic refractory material.

9. The process of claim 8 wherein said catalyst contains from 0.1 to about 2.0 wt. % halogen based on total nonmetallic refractory material.

10. The process of claim 9 wherein said halogen is chlorine.

11. The process of claim 10 wherein said catalyst metals comprise platinum and iridium.

12. The process of claim 10 wherein said catalyst metals comprise platinum and rhenium.

13. The process for the reforming of naphtha feed stock comprising from about 15 to 75 volume percent paraffins and 15 to 75 volume percent naphthenes and boiling at atmospheric pressure in the range of from 120° to 400°F at a temperature in the range of from about 750° to 975°F and a pressure in the range of from 5 to 30 atmospheres with a catalyst comprising a physical mixture of an alumina supported metals component and additional alumina, said alumina supported component comprising a combination of Group VIII metals or a combination including at least one Group VIII metal and at least one metal selected from Group IB or VIIB contained on alumina, the alumina of said alumina supported metals component comprising less than about one-fourth of the total alumina of said catalyst, said catalyst containing from about 0.1 to 2.0 wt. % chlorine, based on total alumina.

14. The process of claim 13 wherein said metals comprise platinum and iridium.

15. The process of claim 13 wherein said metals comprise platinum and rhenium.

* * * * *